United States Patent [19]

Sakurai et al.

[11] Patent Number: 4,486,320

[45] Date of Patent: Dec. 4, 1984

[54] TAPE GUIDE FOR MAGNETIC RECORDING TAPE CASSETTES AND MAGNETIC RECORDING TAPE CASSETTES CONTAINING SAME

[75] Inventors: Kiyoshi Sakurai; Akira Ishi; Yoshihiro Abe, all of Kanagawa, Japan

[73] Assignee: Fuji Photo Film Co., Ltd., Kanagawa, Japan

[21] Appl. No.: 389,359

[22] Filed: Jun. 17, 1982

[30] Foreign Application Priority Data

Jun. 17, 1981 [JP] Japan ................. 56-92217

[51] Int. Cl.$^3$ .............................. C10M 7/00
[52] U.S. Cl. ................... 252/12.6; 226/196; 242/197; 252/11; 252/12; 252/12.4; 360/132
[58] Field of Search ............... 252/12.4, 12.11, 12.6; 308/DIG. 8

[56] References Cited

U.S. PATENT DOCUMENTS

| | | | |
|---|---|---|---|
| 3,464,845 | 9/1969 | Osborn et al. | 252/12 X |
| 3,980,570 | 9/1976 | Okuda et al. | 252/12.4 |
| 4,079,579 | 3/1978 | Cory | 252/12.4 X |
| 4,115,283 | 9/1978 | Needham | 252/12.4 |
| 4,191,345 | 3/1980 | Sato et al. | 242/197 |
| 4,232,350 | 11/1980 | Ohta | 360/132 |
| 4,276,575 | 6/1981 | Schoettle et al. | 308/DIG. 8 X |

FOREIGN PATENT DOCUMENTS 123919  9/1979  Japan ...................... 252/11

OTHER PUBLICATIONS

The Condensed Chemical Dictionary, 9th Edition, 1977, p. 417, "Glycerol Monostearate".
SPE Journal, vol. 26, Apr. 1970; Plastic Bearings: An International Survey, pp. 78-85.

*Primary Examiner*—Andrew Metz
*Attorney, Agent, or Firm*—Sughrue, Mion, Zinn, Macpeak & Seas

[57] ABSTRACT

A tape guide member is disclosed which is prepared from a mixture of engineering plastics, carbon fibers, and an ester of a higher fatty acid, and a polyhydric alcohol. The members may be suitably used as tape guides of video tape cassettes, audio tape cassettes, and memory tape cassettes. Use of the present tape guide results in a lower degree of dropouts after repeated tape running.

8 Claims, No Drawings

TAPE GUIDE FOR MAGNETIC RECORDING TAPE CASSETTES AND MAGNETIC RECORDING TAPE CASSETTES CONTAINING SAME

FIELD OF THE INVENTION

This invention relates to a magnetic recording tape cassette. More particularly, the invention relates to a magnetic recording tape cassette having improved tape guides comprised of particular materials defined herein.

BACKGROUND OF THE INVENTION

In a conventional video cassette, a recording tape is statically charged by the friction of the recording tape with tape guides during the running or travelling of the recording tape. This causes dust to attach to the tape which reduces the imaging characteristics of the recording tape. In order to prevent a reduction of imaging characteristics of a recording tape and also prevent deterioration in the running property by the friction of the tape with a tape guide, metallic guides prepared by specifically grinding stainless steel materials are used as the contact guides for recording tape, as disclosed in U.S. Pat. Nos. 4,204,654 and 4,313,551. However, since metallic guides are liable to be scratched during handling, a complicated operation is required. Also, since the productivity of these metallic guides is low and such guides are very expensive, the employment of metallic guides encounters various industrial problems.

As a result of various investigations on using resinous materials for such tape guides, the present invention has been attained.

The inventors have discovered that the aforesaid faults can be eliminated by using a guide pole prepared by fabricating a composition comprising a mixture of an engineering plastic with about 5 to 50% by weight of carbon fibers and about 0.3 to 5% by weight of an ester of a higher fatty acid and a polyhydric alcohol. That is, this invention is a tape cassette comprising a tape recording cassette having a tape guide prepared by fabricating the mixture having the above composition.

SUMMARY OF THE INVENTION

An object of the present invention is to provide a tape guide for a magnetic recording cassette tape, which is substantially free from being scratched during handling.

Another object of the present invention is to provide a tape guide having high productivity.

A further object of the present invention is to provide a tape guide for a magnetic recording cassette tape having an improved image characteristics of the recording tape.

These objects can be achieved by a tape guide for a magnetic recording cassette tape, the guide being mounted on the cassette in a position so as to contact the tape while the tape is transported, and the guide being composed of a mixture of (1) an engineering plastic, (2) 5 to 50% by weight of carbon fibers based on the weight of the engineering plastic, and (3) 0.3 to 5% by weight of an ester of a higher fatty acid and a polyhydric alcohol based on the weight of the engineering plastic.

DETAILED DESCRIPTION OF THE INVENTION

The term "engineering plastic" as used in this invention refers to plastics having improved mechanical properties, i.e., those having a tensile strength and a flexural strength more than 500 kg/cm$^2$ and a heat deformation temperature more than 80° C. Examples of such engineering plastics are polyphenylene sulfide resins, ABS resins (acrylonitrile-butadiene-styrene resin), polyamide resins, thermoplastic polyester resins, polysulfone, polycarbonate resins, polyphenylene oxide, polyoxymethylene, etc. Preferred examples of engineering plastics are polyphenylene sulfide resins, polyoxymethylene and polyphenylene oxide, and most preferred examples are polyphenylene sulfide resins. Practical examples of the engineering plastics are Lighton PPS made by Phillips Petroleum Company, Styrc made by Asahi-Dow Limited, Nylon 66 made by Toray Industries, Inc., Geranex and Geracon made by Polyplastics Co., Panlite L made by Teijin Kasei K.K., etc.

The term "carbon fiber" as used herein refers to fibers comprising mainly carbon, prepared by heat-decomposing cellulose, polyacrylonitrile, lignin, resinous pitch as raw materials in an inert atmosphere. An example of carbon fibers used in this invention is Toreca T-008-006 (Torecut fiber 6 mm), trade name, made by Toray Industries, Inc. It is preferred that the amount of the carbon fibers used is about 5 to 50% by weight based on the weight of the engineering plastics.

Examples of the higher fatty acid for the ester used in this invention include aliphatic monocarboxylic acids e.g., lauric acid, palmitic acid, stearic acid, oleic acid and the like. Examples of polyhydric alcohols for the ester used in this invention include organic polyhydric compounds having 2 or more alcoholic hydroxy groups in the molecule such as glycerol, ethylene glycol and the like. The ester compounds composed of these components are usually used as chemical lubricants. Preferred examples of the ester compounds include ethylene glycol distearate, glycerol monostearate and glycerol tristearate.

The ester is preferably used in an amount of about 0.3 to 5% by weight based on the weight of the engineering plastics.

The guide pole of this invention can be prepared by mixing pellets of engineering plastics with carbon fibers and the ester of a higher fatty acid and a polyhydric alcohol simultaneously followed by kneading and molding the mixture by means of an ordinary molding machine.

The tape guides of this invention can be used for video tape cassettes, audio tape cassettes, memory tape cassettes, etc., as members thereof to be brought into contact with running recording tapes.

The invention will be explained by the following example.

EXAMPLE

After mixing 100 parts by weight of polyphenylene sulfide (Lighton PPS, made by Phillips Petroleum Company) with 30 parts by weight of carbon fibers (Cut Fiber Toreca T-008-006, made by Toray Industries, Inc.) and 1.5 parts by weight of ethylene glycol distearate simultaneously, the mixture was kneaded and injection-molded by an ordinary manner to provide a guide pole. The guide pole thus prepared was compared with a conventional metal (SUS) guide pole and the guide poles prepared from various compositions shown in Table 1 below. That is, guide poles of this invention and other guide poles were mounted in several sets of video tape cassettes respectively. A 200 times running test using a FF (first forward) rewind system was performed, and the changing ratio of the drop out number (about 15 μsec.) of the tape and mechanical properties of the guide poles were determined. The results are shown in Table 1 below.

engineering plastic selected from the group consisting of polyphenylene sulfide resins, acrylonitrile-butadiene-styrene resins, polyamide resins, thermoplastic polyes-

TABLE 1

| Example No. | Composition of Guide Pole* | | | Flexural Impact Strength (kg/m²) | Initial (15 μs) Drop Out Number | Drop Out Number After 200 Times FF Rewind Running Test | Changes in Drop Out Number Before & After Running Test | Remarks |
| --- | --- | --- | --- | --- | --- | --- | --- | --- |
| | A | B | C | | | | | |
| Example 1 (Present Invention) | 100 | 30 | 1.5 | 1430 | 18.5 | 19 | Unchanged | |
| Comparative Example 1 | 100 | — | — | Not Measurable | — | — | — | Pole was broken when struck into cassette half by a machine. |
| Comparative Example 2 | 100 | 20 | — | 1100 | — | — | — | |
| Comparative Example 3 | 100 | 30 | — | 1430 | 15 | 24 | Unchanged | Generation of tape squeal |
| Comparative Example 4 | Metallic Guide Pole (made of SUS) | | | — | 36.4 | 34 | Unchanged | |

*A: Polyphenylene sulfide, parts by weight
B: Carbon fiber, parts by weight
C: Ethylene glycol distearate, parts by weight As shown in the above table, the resin guide pole of this invention is superior to the conventional metallic tape guide pole (Comparative Example 4). Also, when the molded members of the mixture according to the present invention were used as the guide roller pins of video tape cassettes in the above experiment, no trouble was found.

The guide poles prepared from only polyphenylene sulfide (Comparative Example 1) had a very low mechanical strength which was not measurable. The guide poles of Comparative Example 2 prepared from a mixture of polyphenylene sulfide and carbon fibers (20 parts by weight) had a markedly improved mechanical strength as compared with those of Comparative Example 1, but were broken when the guide poles are struck into cassette half by a fabrication machine and were not practically useful. The guide poles of Comparative Example 3 prepared from a mixture of polyphenylene sulfide and carbon fibers (30 parts by weight) had a sufficient mechanical strength, but the number of drop out after 200 times running test increased as compared with the initial number of dropout and, moreover, tape squeal was generated.

On the other hand, the guide poles prepared according to the present invention showed any changes in the number of drop out before and after the 200 times running test and further no tape squeal was found. Thus, the tape guide according to the present invention showed markedly improved mechanical strength and image characteristics.

While the invention has been described in detail and with reference to specific embodiment thereof, it will be apparent to one skilled in the art that various changes and modifications can be made therein without departing from the spirit and scope thereof.

What is claimed is:

1. In a magnetic recording tape cassette provided with a tape guide, the improvement wherein the tape guide is composed of a composition comprising (1) an engineering plastic selected from the group consisting of polyphenylene sulfide resins, acrylonitrile-butadiene-styrene resins, polyamide resins, thermoplastic polyester resins, polysulfone, polycarbonate resins, polyphenylene oxide and polyoxymethylene, (2) an ester of a higher fatty acid with a polyhydric alcohol, said ester being contained in an amount of 0.3 to 5% by weight based on the weight of said engineering plastic, and (3) 5 to 50% by weight of carbon fibers based on the weight of said engineering plastic.

2. A magnetic recording cassette tape as claimed in claim 1, wherein the guide is a guide roller pin.

3. A magnetic recording cassette tape as claimed in claim 1, wherein said ester is composed of an aliphatic monocarboxylic acid having at least 6 carbon atoms and an organic polyhydric compound having at least two hydroxy groups.

4. A magnetic recording cassette tape as claimed in claim 3, wherein said ester is selected from the group consisting of ethylene glycol distearate, glycerol monostearate and glycerol tristearate.

5. In a magnetic recording tape cassette provided with a tape guide, the improvement wherein the tape guide is composed of a composition comprising (1) a polyphenylene sulfide resin, (2) an ester of a higher fatty acid with a polyhydric alcohol, said ester being contained in an amount of 0.3 to 5% by weight based on the weight of said resin, and (3) 5 to 50% by weight of carbon fibers based on the weight of said resin.

6. A tape guide for a magnetic recording cassette tape as claimed in claim 5, wherein the guide is a guide roller pin.

7. A tape guide for a magnetic recording cassette tape as claimed in claim 5, wherein said ester is composed of an aliphatic monocarboxylic acid having at least 6 carbon atoms and an organic polyhydric compound having at least two hydroxy groups.

8. A tape guide for a magnetic recording cassette tape as claimed in claim 7, wherein said ester is selected from the group consisting of ethylene glycol distearate, glycerol monostearate and glycerol tristearate.

* * * * *